(No Model.)

S. B. WILLIS.
CAR FENDER.

No. 551,328. Patented Dec. 10, 1895.

WITNESSES:
Edward C. Rowland
John Lotka

INVENTOR
S. B. Willis
BY Munn & Co
ATTORNEYS.

UNITED STATES PATENT OFFICE.

SAMUEL B. WILLIS, OF NEW YORK, N. Y., ASSIGNOR TO MICHAEL C. MURPHY, OF SAME PLACE.

CAR-FENDER.

SPECIFICATION forming part of Letters Patent No. 551,328, dated December 10, 1895.

Application filed April 15, 1895. Serial No. 545,775. (No model.)

*To all whom it may concern:*

Be it known that I, SAMUEL B. WILLIS, of New York city, county and State of New York, have invented certain new and useful Improvements in Car-Fenders, of which the following is a full, clear, and exact description.

My invention relates to car-fenders, and particularly to that class of fenders that are movable longitudinally of the car for the purpose of projecting the fender in front of the car, when desired, or drawing it back toward the car so as to avoid damage to the fender by collision. As constructed hitherto, such fenders have been either mounted to slide longitudinally of the car, in which case a sufficient free space must be provided under the car to receive the fender in substantially its entire length, or the fender has been hinged to the car, to fold up against the dashboard. This, however, also is objectionable as it does not fully protect the fender in the case of a collision, and moreover, it interferes with the coupling of cars and obstructs the headlight. In order to overcome these defects, I employ a fender of a novel construction, whereby the fender will readily fold toward or under the car, and the space required for the reception of the fender will be considerably less than the full length of the fender when it is projected in advance of the car.

The invention will be fully described hereinafter, and the features of novelty pointed out in the appended claims.

Reference is to be had to the accompanying drawings, in which—

Figure 1:
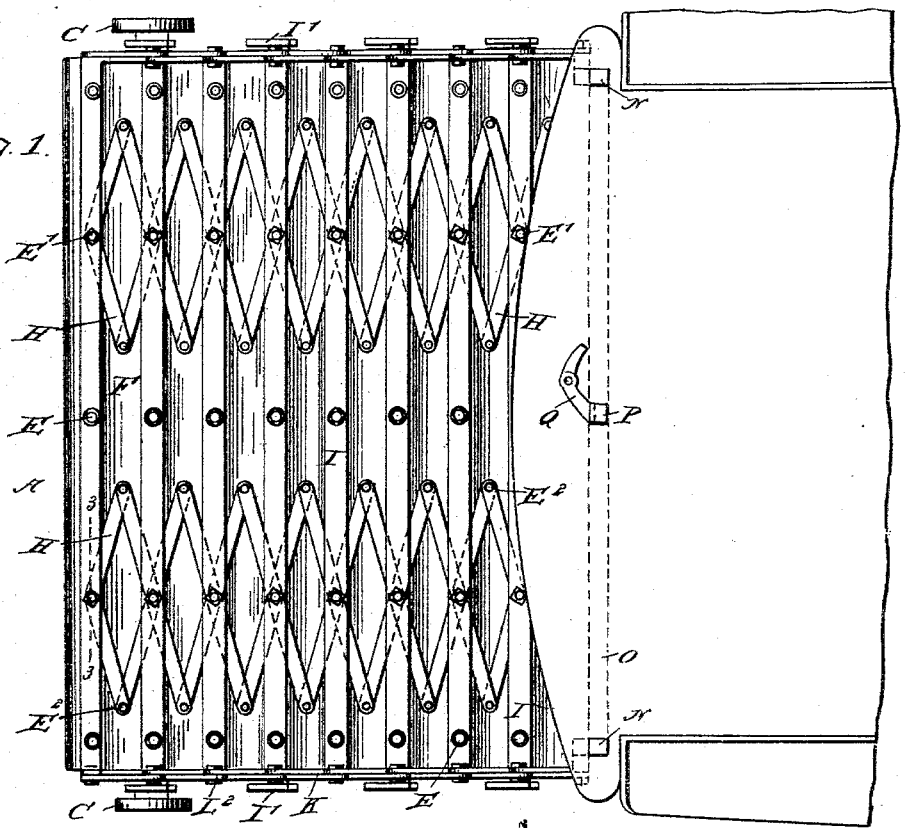
Figure 2:
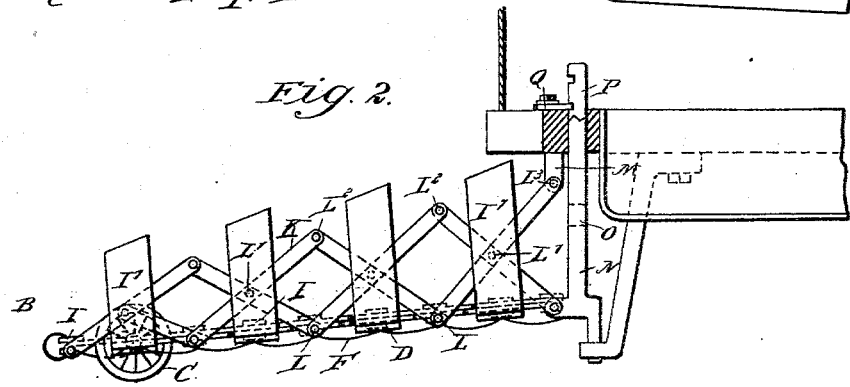
Figure 3:
Figure 4:
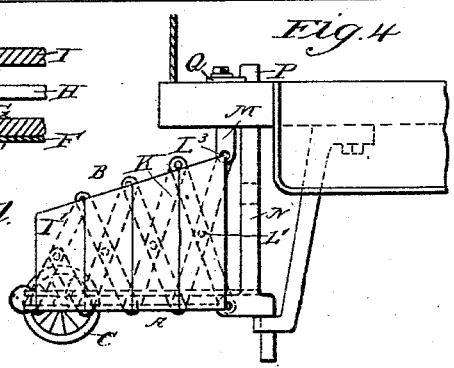

Figure 1 is a plan of the fender attached to a car and in the projected or extended position. Fig. 2 is a side elevation thereof. Fig. 3 is an enlarged broken cross-sectional view on line 3 3 of Fig. 1, and Fig. 4 is a side elevation showing the fender closed.

Like letters indicate corresponding parts in all the views.

In carrying out the invention, I prefer to construct the fender proper of three parts, viz: the bottom A and the sides B. The bottom normally is inclined forwardly and downwardly and extends at a slight distance above the track, and wheels C are provided for the purpose of preventing the end of the fender from coming in contact with the track when the car oscillates up and down or when a person is caught upon the fender. The bottom A comprises a lower set of slats D ranging transversely of the car and having vertical bolts E extending through them. The said bolts, in addition to functions that will appear hereinafter, may also have that of securing to the slats D a layer of canvas F which is located under the slats. Some of the bolts, designated E', constitute pivots which are surrounded, above the lower slats D, by washers G G', receiving between them two sets of lazy-tongs H, which form a connection between the slats. The bolts E and E' also pass through an upper set of slats I, parallel to the slats D, and springs J are preferably interposed between the said upper slats and the upper washers G', (see Fig. 3,) so as to make the upper slats yielding to reduce the concussion in the event of a person being thrown on the fender. For the same purpose a yielding strip or a rubber tube inflated with air may be attached to the front edge of the fender. The ends of the lazy-tongs are pivotally connected between each two adjacent slats, as indicated at $E^2$.

The sides B consist of vertically-disposed sets of lazy-tongs K, which may be either single or double and whose lower ends are pivoted to the ends of alternate slats D, as indicated at L. The lazy-tongs K are also pivotally connected with each other at their central positions, by means of bolts L', and at their upper ends, as shown at $L^2$. The rear lazy-tongs are pivoted at their upper ends to brackets M projected from the car, as indicated at $L^3$. Instead of connecting only alternate bottom slats D to the lateral lazy-tongs K, it is obvious that the said lazy-tongs might be connected with each of the bottom slats. They might, also, without departing from the nature of my invention, be connected with the upper slats I instead of the lower slats D. The lazy-tongs K, as shown, are gradually reduced in height toward the outer end of the fender, and the slats D and I, which are between those connected to the lazy-tongs K, carry slats I' which are of such a width that when the fender is closed, they will form a plane side surface. (See Fig. 4.)

Various means can be employed for supporting the fender in either the active or the inactive position and for folding it toward the car. As illustrated by the drawings, the lower ends of the rear lazy-tongs K are pivotally connected to uprights N fitted to slide vertically in suitable sockets on the car. A cross-bar O connects the said uprights and from the center of the cross-bar projects upwardly an operating-bar P, which is made in the nature of a rack and passes through the platform of the car so that the motorman or gripman can actuate it by stepping on it. A pawl Q serves to hold the rack and the fender in position. It will be observed that under this construction the fender may be projected from the car more or less.

The normal extended position of the fender will be seen best in Fig. 2. If desired, the fender might be projected still farther and usually the fender is to be pulled forward into the extended position by an operator, but if desired the fender may be projected by raising the operating-bar P. The fender, as shown, will extend horizontally, with the bottom A above the track and the wheels C above the rails. It will be observed that the forward movement of the fender will also cause the bottom A to be raised, as the rack P and the uprights N slide upward during such movement. When the fender strikes a person, it will be flexed downward by the weight of the person so that the wheels C will rest upon the rails and thus reduce the strain to which the fender is subjected. The upper slats I of the bottom being yielding, as described, will protect the person struck against serious injury. The sides B will prevent the person from being thrown to the side of the track. In case an obstruction should be upon the track the operator, by throwing the pawl Q out of mesh with the rack P, will release the fender, so that when it comes in contact with the obstruction the fender will not be damaged, but will automatically fold toward the car. If desired, the motorman or gripman can fold the fender before it strikes the obstruction by stepping on the rack-bar P after throwing the pawl Q out of engagement therewith. It will be seen that the fender when folded will take up very little space. As the fender is flexible longitudinally, it will not break in case the up-and-down oscillation of the car should cause the fender to come in contact with the road.

I desire it to be understood that various modifications may be made without departing from the nature of my invention. The lateral lazy-tongs K, although a desirable feature of the fender, are not absolutely necessary. Instead of two sets of lazy-tongs H, a greater number may be employed, or one set may suffice in certain cases. A weight might be placed on the uprights N to cause the fender to fold automatically upon the release of the rack P.

Having thus described my invention, I claim as new and desire to secure by Letters Patent—

1. A car fender having in combination a series of transverse parallel bars or slats movable toward and away from each other in retracting and distending the fender, and means extending within reach of the operator on the car platform for moving the same, substantially as described.

2. A car fender having in combination a series of transverse bars or slats, lazy-tongs connected therewith, and means extending within reach of the operator on the car platform for operating said lazy-tongs to distend and retract the fender, substantially as described.

3. A car fender having in combination a series of transverse bars or slats, lazy-tongs at both ends of said bars or slats and connected therewith, and means extending within reach of the operator on the car platform, for operating said lazy-tongs to distend and retract the fender, substantially as described.

4. A car fender having in combination a series of transverse parallel bars or slats movable toward and away from each other in retracting and distending the fender, means extending within reach of the operator on the car platform for shifting said bars or slats, and a locking device on the car platform for locking said operating means to hold the fender in the desired position, substantially as described.

5. A car fender having in combination lazy-tongs for distending and retracting the fender, and means for operating said lazy-tongs, said operating means being adapted to be locked in its several positions to maintain the fender in the desired position, substantially as described.

6. A car fender having in combination lazy-tongs for distending and retracting the fender, an operating bar extending within reach of the operator on the car platform, for working the lazy-tongs, and a locking device for locking the operating bar in the desired position, substantially as described.

7. A car fender having in combination horizontally arranged lazy-tongs, and sides composed of vertically arranged lazy-tongs, substantially as described.

8. A folding car fender, comprising a longitudinally folding bottom, and sides provided with lazy-tongs disposed approximately vertically and pivotally connected with the bottom, substantially as described.

9. A folding car fender, comprising a series of transverse slats forming the bottom of the fender, said slats being movable toward and from each other, and vertically disposed lazy-tongs pivotally connected with the bottom at the sides thereof, substantially as described.

10. A car fender, having in combination a series of transverse bars or slats, lazy-tongs connecting said bars or slats together, and lazy-tongs arranged vertically with relation to the bars or slats and whereby said bars or slats are moved toward and away from each other to retract and distend the fender, substantially as described.

11. The combination with the car, of the fender bottom provided with horizontally disposed lazy-tongs, the fender sides provided with vertically disposed lazy-tongs pivotally connected with the bottom and having one of their ends secured to the car, operating bars connected to the other end of the vertical lazy-tongs and means for locking said operating bars in position, substantially as described.

12. A car fender having a bottom comprising horizontally disposed lazy-tongs, slats located above the lazy-tongs, and vertically movable in relation thereto, and springs interposed between the lazy-tongs and the slats, substantially as described.

13. A car fender comprising horizontally disposed lazy-tongs, transverse slats connecting the same, and a flexible bottom secured below the slats, substantially as described.

SAMUEL B. WILLIS.

Witnesses:
JOHN LOTKA,
F. W. HANAFORD.